(12) United States Patent
Pelicia et al.

(10) Patent No.: US 10,656,665 B2
(45) Date of Patent: May 19, 2020

(54) POWER MANAGEMENT FOR LOGIC STATE RETENTION

(71) Applicant: NXP USA, INC., Austin, TX (US)

(72) Inventors: Marcos Mauricio Pelicia, Campinas (BR); Alex Rocha Prado, Campinas (BR)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/010,050

(22) Filed: Jun. 15, 2018

(65) Prior Publication Data

US 2019/0384339 A1 Dec. 19, 2019

(51) Int. Cl.
G05F 1/56 (2006.01)
G05F 1/613 (2006.01)
G05F 1/00 (2006.01)

(52) U.S. Cl.
CPC ............ *G05F 1/613* (2013.01); *G05F 1/00* (2013.01); *G05F 1/56* (2013.01)

(58) Field of Classification Search
CPC ..................................................... G05F 1/613
USPC ......................................................... 327/540
See application file for complete search history.

(56) References Cited

U.S. PATENT DOCUMENTS

| 4,716,463 | A  | * | 12/1987 | Stacy ...................... H04N 5/63 327/386 |
| 6,516,381 | B1 | * | 2/2003 | Hamilton ............ G06F 13/4072 711/105 |
| 7,449,872 | B2 |   | 11/2008 | Zolfaghari |
| 7,531,995 | B2 | * | 5/2009 | Hara ...................... H02M 3/157 323/274 |
| 7,701,245 | B1 |   | 4/2010 | Vasudevan |
| 7,737,720 | B2 |   | 6/2010 | Udgunji et al. |
| 7,875,996 | B2 |   | 1/2011 | Nguyen et al. |
| 7,961,546 | B2 | * | 6/2011 | Mair ...................... G11C 5/147 365/226 |
| 8,278,888 | B2 |   | 10/2012 | Egan et al. |
| 8,536,853 | B2 |   | 9/2013 | Sessions |
| 8,856,562 | B2 | * | 10/2014 | Huang ...................... G05F 3/02 713/300 |
| 8,934,307 | B2 | * | 1/2015 | Chu ........................ G11C 5/145 365/185.2 |
| 9,525,341 | B2 | * | 12/2016 | Pan .......................... G05F 1/59 |
| 9,618,956 | B2 | * | 4/2017 | Gill ............................ G05F 3/02 |
| 2010/0315056 | A1 |   | 12/2010 | Sessions |
| 2015/0234452 | A1 | * | 8/2015 | Heo ...................... G06F 1/3296 713/320 |
| 2015/0357900 | A1 |   | 12/2015 | Nix |

OTHER PUBLICATIONS

Gjanci, J., "A Hybrid Scheme for On-Chip Voltage Regulation in System-On-a-Chip (SOC)", IEEE Transactions on Very Large Scale Integration (VLSI) Systems, vol. 19, No. 11, Nov. 2011.

* cited by examiner

Primary Examiner — Dinh T Le

(57) ABSTRACT

A power management system is provided. The power management system includes a first voltage regulator having an input coupled to a first voltage supply terminal and an output. The first voltage regulator is configured to provide an operating voltage at the output. A second voltage regulator has an input coupled to the output of the first voltage regulator. The second voltage regulator is configured to provide at an output a retention voltage based on a control signal. A control circuit is coupled to the second voltage regulator and configured to provide the control signal to the second voltage regulator.

17 Claims, 2 Drawing Sheets

POWER MANAGEMENT FOR LOGIC STATE RETENTION

BACKGROUND

Field

This disclosure relates generally to electronic circuits, and more specifically, to a power management for logic state retention.

Related Art

Today, many microcontrollers and systems-on-a-chip (SoC) devices are battery operated. Power consumption becomes a more critical concern as these devices gain complexity. Such complex devices include low power modes to extend battery life. One of the key obstacles to benefit from these low power modes is the latency times associated with entering and exiting low power modes. Because latency times may negatively impact performance and power consumption, low power modes may not be utilized sufficiently. Therefore, a need exists for a power management system that addresses low power obstacles.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a power management system that includes a second voltage regulator in series with a first voltage regulator 104 to provide a reduced voltage during a low power mode. The first regulator is coupled to an external capacitor and provides a normal operating voltage to a logic circuit while the second regulator is bypassed. The second regulator uses energy stored in the external capacitor to provide the reduced voltage and leakage current to the logic circuit during the low power mode. When in the low power mode, the first regulator is disabled or operated in a low power manner to further extend battery life. Because the intrinsic capacitance of the logic circuit is much smaller than the capacitance of the external capacitor and the second regulator decouples loading of the logic circuit from the first regulator, the regulator arrangement of the power management system allows for quick voltage transitions into and out of low power modes saving additional power.

Figure 1:
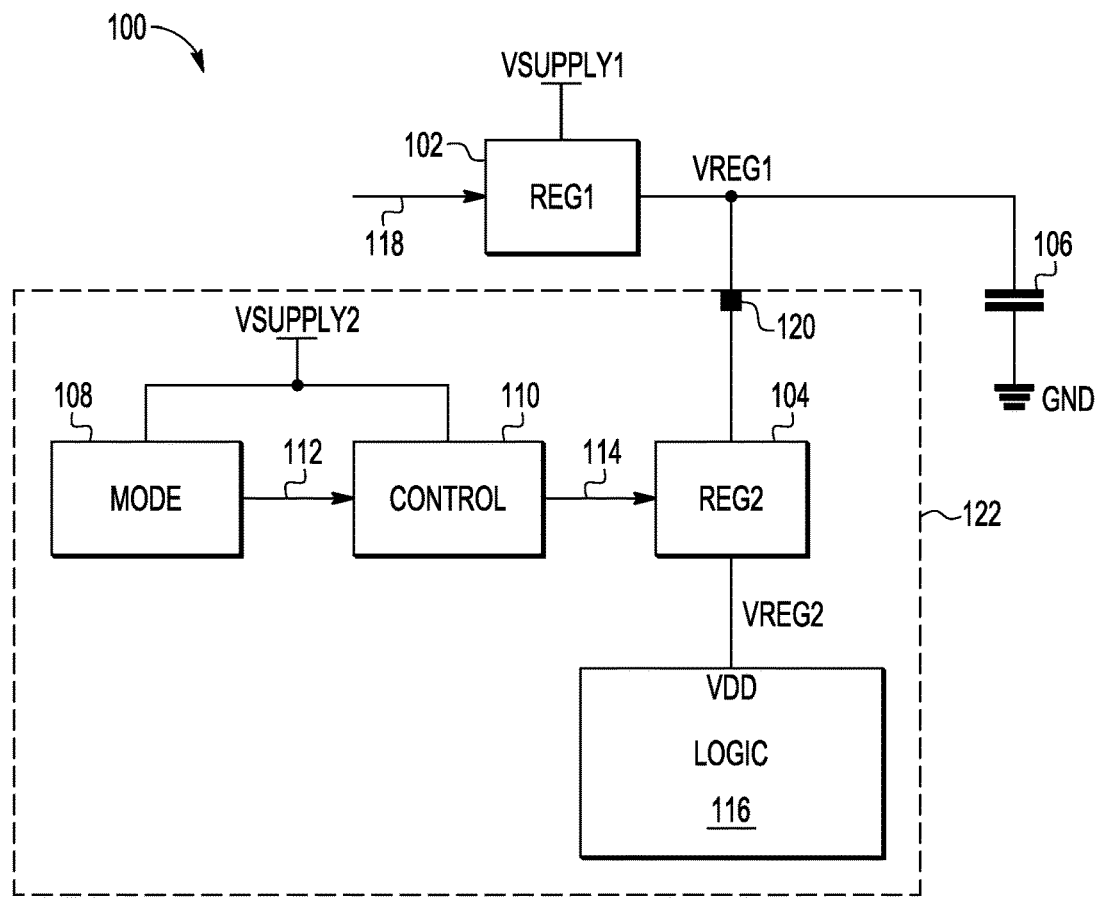
FIG. 1 illustrates, in simplified block diagram form, an example power management system in accordance with an embodiment.

FIG. 1 illustrates, in simplified block diagram form, an example power management system 100 in accordance with an embodiment. In one embodiment, the power management system 100 includes a first voltage regulator 102, a second voltage regulator 104 including a bypass switch, an external capacitor 106, a mode circuit 108, a control circuit 110, and a logic circuit 116. In one embodiment, second voltage regulator 104, mode circuit 108, control circuit 110, and logic circuit 116 may be implemented in a single integrated circuit (IC) as indicated with dashed line 122. In some embodiments, IC 122 may be integrated as a system-on-a-chip (SoC). In another embodiment, first voltage regulator 102 may be integrated within the IC 122.

The first voltage regulator 102 may be any suitable type of voltage regulator such as a buck converter, low drop-out (LDO) regulator, linear regulator, and the like. Regulator 102 includes a first input coupled to receive a first supply voltage VSUPPLY1 at supply voltage terminal labeled VSUPPLY1. Regulator 102 includes an output coupled to external capacitor 106 and provides a first regulated voltage VREG1 at node labeled VREG1. Regulator 102 also includes a second input coupled to receive a first control signal 118. In some embodiments, regulator 102 may be configured to be enabled and/or in a low power state by way of control signal 118. For example, regulator 102 may be enabled when control signal 118 is in a first state and in a low power mode when control signal 118 is in a second state. In some embodiments, regulator 102 may be electrically isolated from node VREG1 while in the low power mode. In some embodiments, regulator 102 may be configured to regulate voltage VREG1 at a retention voltage while in the low power mode. In some embodiments, regulator 102 may be configured to regulate voltage VREG1 at a normal operating voltage while in the low power mode.

The second voltage regulator 104 may be any suitable type of voltage regulator (e.g., LDO regulator). In an embodiment, second voltage regulator 104 is designed as a low power, capacitor-less voltage regulator utilizing intrinsic capacitance instead of a dedicated capacitor. Regulator 104 includes a first input coupled to receive the voltage VREG1 at input terminal 120 of IC 122. Regulator 104 includes an output coupled to logic circuit 116 and when enabled, provides a second regulated voltage VREG2 at node labeled VREG2. Regulator 104 also includes a second input coupled to receive a second control signal 114 from control circuit 110. In some embodiments, regulator 104 may be configured to be enabled and/or disabled (e.g., bypassed) by way of control signal 114. For example, regulator 104 may be enabled when control signal 114 is in a first state and bypassed when control signal 114 is in a second state. When enabled, regulator 104 is configured to receive a voltage (e.g., VREG1) at the first input and generate at the output a voltage (e.g., VREG2) suitable for a low power mode. When disabled (e.g., bypassed), regulator 104 may electrically couple voltages at node VREG1 to node VREG2 (e.g., VREG2≈VREG1). According to embodiments, VREG2 is characterized as a voltage supply (e.g., VDD) for at least a portion of logic circuit 116.

Capacitor 106 may be any type of capacitor formed from any suitable materials and structures. Capacitor 106 is generally located external to the IC 122 and may be used for filtering, regulator stability, or suppression of high load transient currents, for example. Capacitor 106 includes a first terminal coupled to the output of the first regulator 102 at node VREG1 and a second terminal coupled to a ground voltage supply terminal labeled GND. In an embodiment, capacitor 106 may have a capacitance value in a range of 0.5 µF to 10.0 µF. In other embodiments, capacitor 106 may have capacitance values less than 0.5 µF or greater than 10.0 µF.

Mode circuit 108 and control circuit 110 are used to generate second control signal 114. Mode circuit 108 and control circuit 110 may be included in a power management unit of a system-on-chip (SoC), for example. Mode circuit 108 and control circuit 110 may directly and/or indirectly communicate with a processor on the SoC. According to an embodiment, mode circuit 108 and control circuit 110 are coupled to a voltage supply labeled VSUPPLY2 that remains active during a low power mode. In some embodiments, a coin cell battery may be used to provide the VSUPPLY2 voltage during a low power mode.

The mode circuit 108 is configured to generate mode signal 112 which is indicative of one or more modes of operation. For example, a first state of mode signal 112 may be indicative of a low power mode and a second state of mode signal 112 may be indicative of a normal operating mode. In some embodiments, mode signal 112 may include multiple mode signals and may correspond to multiple operating and low power modes. In an embodiment, the low power mode may correspond to a retention mode where the voltage supplied to a circuit block (e.g., logic circuit 116) is lowered to a minimum voltage value by which storage elements (e.g., flip-flops, latches, RAM cells) in the circuit block will retain stored states.

Control circuit 110 is coupled to receive mode signal 112 output from mode circuit 108. Control circuit 110 generates second control signal 114 based on mode signal 112. For example, control circuit 110 may enable second voltage regulator 104 by way of second control signal 114 during a low power mode (e.g., second control signal 114 at a first state) and may bypass second voltage regulator during a normal operating mode (e.g., second control signal 114 at a second state).

Logic circuit 116 is coupled to the output of second voltage regulator 104 at node VREG2. According to embodiments, VREG2 is characterized as a voltage supplied (e.g., VDD) to logic circuit 116. Logic circuit 116 includes one or more elements configured to retain a logic state such as flip-flops, latches, register file bits, RAM cells, and the like. In an embodiment, logic circuit 116 may be formed as a sea of gates (SoG) or a portion of a SoG including synthesized and place and routed random logic and memory circuits, for example.

Operation of the power management system 100 is further described by way of example. In a normal operating mode, control signal 118 is at a first state enabling the first voltage regulator 102. While enabled, the first voltage regulator 102 receives the first supply voltage VSUPPLY1 (e.g., 1.8 volts) and generates a regulated voltage VREG1 (e.g., 1.0 volts). Capacitor 106 coupled to the output of the first voltage regulator 102 provides filtering or regulator stability by storing energy. The second voltage regulator 104 is bypassed (e.g., control signal 114 at a second state) during the normal operating mode. While bypassed, the input of the second voltage regulator 104 (e.g., VREG1 at node 120) is coupled to the output of the second voltage regulator 104 (e.g., VREG2) such that the VREG2 voltage is approximately equal to the VREG1 voltage (e.g., 1.0 volts). Accordingly, the logic circuit 116 coupled to the output of the second voltage regulator 104 receives a supply voltage at the VDD input approximately equal to the VREG1 voltage (e.g., 1.0 volts) as a normal operating voltage.

In a low power mode, the first voltage regulator 102 is set to a low power state and the second voltage regulator 104 is enabled by way of respective control signals 118 (e.g., at second state) and 114 (e.g., at first state). While the first voltage regulator 102 is in the low power state, VSUPPLY1 is decoupled from the output of the first voltage regulator 102. In turn, VSUPPLY1 may be disabled or powered down. During the low power mode, VSUPPLY2 remains active (e.g., by way of coin cell battery or other voltage source) supplying a sufficient voltage (e.g., 1.0 volts) for mode and control circuits 108 and 110 to operate normally. While enabled, the second voltage regulator 104 is configured to receive the voltage VREG1 (e.g., initially 1.0 volts) at node 120 and generate a regulated voltage VREG2 (e.g., 0.6 volts) as a VDD voltage sufficient to retain logic states in storage elements (e.g., flip-flops, latches, memory cells) of the logic circuit 116. In the low power mode, the voltage VREG1 will decay over time as charge from capacitor 106 is depleted while sourcing leakage current drawn by the logic circuit 116. If the low power mode remains for an extended period of time, the second voltage regulator 104 may be bypassed (e.g., control signal 114 switched to second state) when VREG1 reaches the VREG2 value. A wake-up routine may activate VSUPPLY1 and first voltage regulator 102 to recharge capacitor 106 to a predetermined level (e.g., 1.0 volts) then return to respective low power states.

Figure 2:
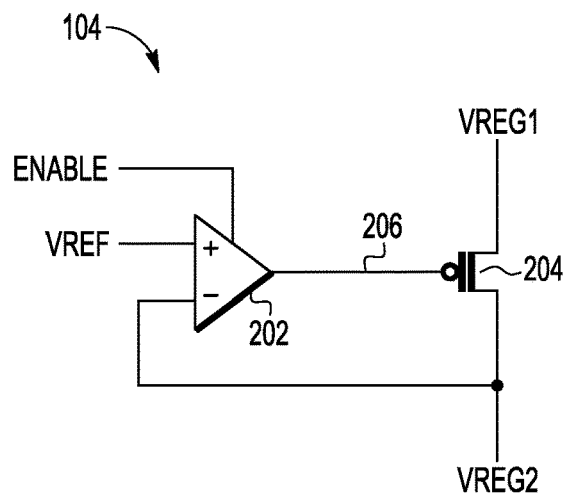
FIG. 2 illustrates, in simplified schematic diagram form, an example implementation of regulator 104 of FIG. 1 in accordance with an embodiment.

FIG. 2 illustrates, in simplified schematic diagram form, an example implementation of the second voltage regulator 104 of FIG. 1 including a bypass mode in accordance with an embodiment. In an embodiment, the second voltage regulator 104 is implemented as an LDO regulator. The example LDO regulator includes an operational amplifier 202 and a P-channel pass transistor 204.

Operation amplifier 202 includes a non-inverting input coupled to receive a reference voltage labeled VREF, an inverting input coupled to receive a feedback voltage, a control input coupled to receive a control signal labeled ENABLE, and an output coupled to the control electrode (e.g., gate) of transistor 204 at node 206. Transistor 204 includes a first current electrode (e.g., source) coupled to receive input voltage VREG1 at input labeled VREG1 and a second current electrode (e.g., drain) coupled to provide an output voltage VREG2 at output labeled VREG2.

In operation, when control signal ENABLE is in a first state (e.g., logic high level), the operation amplifier 202 serves as an error amplifier and controls the gate voltage of transistor 204 to regulate the output voltage VREG2. When control signal ENABLE is in a second state (e.g., logic low level), the output of operational amplifier 202 is pulled to ground (e.g., logic low level) causing transistor 204 to be fully turned on (e.g., conducting) and the voltage VREG2 to be approximately equal to the voltage VREG1. When control signal ENABLE is in the second state, the regulator 104 is effectively disabled allowing transistor 204 to function in a bypass mode.

Figure 3:
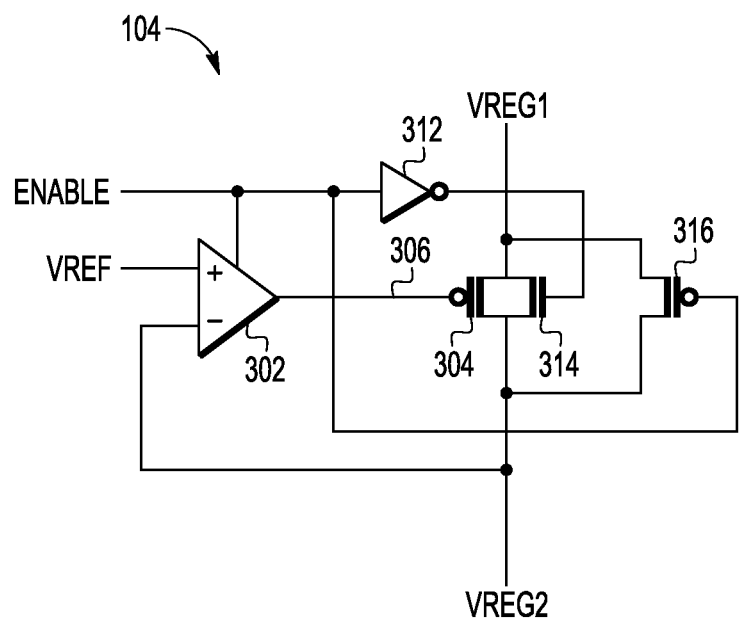
FIG. 3 illustrates, in simplified schematic diagram form, an alternative example implementation of regulator 104 of FIG. 1 in accordance with an embodiment.

FIG. 3 illustrates, in simplified schematic diagram form, an alternative example implementation of the second voltage regulator 104 of FIG. 1 including a bypass circuit in accordance with an embodiment. In an alternative embodiment, the second voltage regulator 104 is implemented as an LDO regulator including a bypass circuit. The alternative example LDO regulator includes an operational amplifier 302, a P-channel pass transistor 304, and a bypass circuit including N-channel transistor 314, P-channel transistor 316, and inverter 312.

Operation amplifier 302 includes a non-inverting input coupled to receive a reference voltage labeled VREF, an inverting input coupled to receive a feedback voltage at node VREG2, a control input coupled to receive a control signal labeled ENABLE, and an output coupled to the control electrode (e.g., gate) of transistor 304 at node 306. Transistor 304 includes a first current electrode (e.g., source) coupled to receive input voltage VREG1 at input labeled VREG1 and a second current electrode (e.g., drain) coupled to provide an output voltage VREG2 at output labeled VREG2. The bypass circuit includes transistors 314 and 316 coupled in parallel to form a transmission gate or switch between input VREG1 and output VREG2, and inverter 312 coupled to receive the control signal ENABLE. First current electrodes of transistors 314 and 316 are coupled to input VREG1 and second current electrodes of transistors 314 and 316 are coupled to output VREG2. The control electrode of transistor 316 is coupled to receive the control signal ENABLE and the control electrode of transistor 314 is coupled to receive the complement of control signal ENABLE at the output of inverter 312.

In operation, when control signal ENABLE is in a first state (e.g., logic high level), the bypass circuit is disabled and the operation amplifier 302 serves as an error amplifier and controls the gate voltage of transistor 304 to regulate the output voltage VREG2. When control signal ENABLE is in a second state (e.g., logic low level), the output of operational amplifier 302 is pulled to a logic high level causing transistor 304 to be fully turned off (e.g., non-conducting) and bypass circuit is enabled causing the voltage VREG2 to be approximately equal to the voltage VREG1. When control signal ENABLE is in the second state, the regulator 104 is effectively disabled allowing transistors 314 and 316 to function in a bypass mode.

Generally, there is provided, a power management system including a first voltage regulator having an input coupled to a first voltage supply terminal and an output, the first voltage regulator configured to provide an operating voltage at the output; a second voltage regulator having an input coupled to the output of the first voltage regulator, the second voltage regulator configured to provide at an output a retention voltage based on a control signal; and a control circuit coupled to the second voltage regulator, the control circuit configured to provide the control signal to the second voltage regulator. The system may further include a logic circuit coupled to receive the retention voltage at the output of the second voltage regulator, the logic circuit including elements configured to retain a logic state. The logic circuit may include a static random-access memory (SRAM) cells. The control signal may be in a first state during a retention mode and a second state during an operating mode. The second voltage regulator may be further configured to provide the operating voltage at the output based on the control signal in the second state. The first voltage regulator may be in a low power state during the retention mode and the second voltage regulator may be bypassed during the operating mode. The system may further include a capacitor coupled to the output of the first voltage regulator. The second voltage regulator and the control circuit may be formed as part of an integrated circuit (IC), the capacitor separate from the IC. The second voltage regulator may be formed as a cap-less low-dropout (LDO) regulator. The cap-less LDO regulator may include a transistor having a first current electrode coupled to the output of the first voltage regulator and a second current electrode coupled to provide the retention voltage based on the control signal.

In another embodiment, there is provided, a power management system including a first voltage regulator having an input coupled to a first voltage supply terminal and an output, the first voltage regulator configured to provide an operating voltage at the output; a second voltage regulator having an input coupled to the output of the first voltage regulator and an output, the second voltage regulator configured to provide a first voltage based on a first state of a control signal and a second voltage based on a second state of the control signal; and a control circuit coupled to the second voltage regulator, the control circuit configured to provide the control signal to the second voltage regulator. The first state may correspond to a low power mode and a second state may correspond to an operating mode. The first voltage may be lower than the second voltage. The system may further include a logic circuit coupled to the output of the second voltage regulator, the logic circuit including elements configured to retain a logic state. The second voltage regulator may be configured to couple the input to the output based on the second state of the control signal. The system may further include a capacitor coupled to the output of the first voltage regulator. The second voltage regulator and the control circuit may be formed as part of an integrated circuit (IC), the capacitor separate from the IC.

In yet another embodiment, there is provided, a power management system including a first voltage regulator having an input coupled to a first voltage supply terminal and an output, the first voltage regulator configured to provide an operating voltage at the output; a second voltage regulator having an input coupled to the output of the first voltage regulator and an output, the second voltage regulator configured to provide a first voltage in a first mode and to couple the input to the output in a second mode; and a capacitor coupled to the output of the first voltage regulator. The system may further include a logic circuit coupled to the output of the second voltage regulator, the logic circuit including elements configured to retain a logic state. The second voltage regulator may be formed as part of an integrated circuit (IC) and the capacitor may be located external to the IC.

By now it should be appreciated that there has been provided, a power management system that includes a second voltage regulator in series with a first voltage regulator 104 to provide a reduced voltage during a low power mode. The first regulator is coupled to an external capacitor and provides a normal operating voltage to a logic circuit while the second regulator is bypassed. The second regulator uses energy stored in the external capacitor to provide the reduced voltage and leakage current to the logic circuit during the low power mode. When in the low power mode, the first regulator is disabled or operated in a low power manner to further extend battery life. Because the intrinsic capacitance of the logic circuit is much smaller than the capacitance of the external capacitor and the second regulator decouples loading of the logic circuit from the first regulator, the regulator arrangement of the power management system allows for quick voltage transitions into and out of low power modes saving additional power.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A power management system comprising:
    a first voltage regulator having an input coupled to a first voltage supply terminal and an output, the first voltage regulator configured to provide a first regulated voltage as an operating voltage at the output based on a first control signal received at the first voltage regulator;
    a second voltage regulator having an input coupled to the output of the first voltage regulator, the second voltage regulator configured to provide at an output a regulated voltage based on a second control signal;
    a logic circuit coupled to receive the regulated voltage at the output of the second voltage regulator, the logic circuit comprising elements configured to retain a logic state; and
    a control circuit coupled to the second voltage regulator, the control circuit configured to provide the second control signal to the second voltage regulator.

2. The system of claim 1, wherein the logic circuit comprises a static random-access memory (SRAM) cells.

3. The system of claim 1, wherein the second control signal is in a first state during a retention mode and a second state during an operating mode.

4. The system of claim 3, wherein the second voltage regulator is further configured to provide the operating voltage as the regulated voltage at the output based on the second control signal in the second state.

5. The system of claim 3, wherein the first voltage regulator is in a low power state during the retention mode and the second voltage regulator is bypassed during the operating mode.

6. The system of claim 1, further comprising a capacitor coupled to the output of the first voltage regulator.

7. The system of claim 6, wherein the second voltage regulator and the control circuit are formed as part of an integrated circuit (IC), the capacitor separate from the IC.

8. The system of claim 1, wherein the second voltage regulator is formed as a cap-less low-dropout (LDO) regulator.

9. The system of claim 8, wherein the cap-less LDO regulator includes a transistor having a first current electrode coupled to the output of the first voltage regulator and a second current electrode coupled to provide the regulated voltage based on the second control signal.

10. A power management system comprising:
    a first voltage regulator having a first input and a first output, the first voltage regulator to receive a supply voltage at the first input, to regulate the supply voltage to a first regulated voltage, and to provide the first regulated voltage at the first output;
    a second voltage regulator having a second input coupled to the first output, a second output, and a first control input, the second voltage regulator to receive the first regulated voltage at the second input, to regulate the first regulated voltage to a second regulated voltage and provide the second regulated voltage at the second output when a first control signal received at the first control input is in a first state, and to provide the first regulated voltage at the second output when the first control signal is in a second state; and
    a capacitor having a first terminal coupled to the first output and a second terminal coupled to a ground plane;
    wherein first voltage regulator regulates the supply voltage to the first regulated voltage and provides the first regulated voltage at the first output when a second control signal received at the second control input of the first voltage regulator is in a third state.

11. The power management system of claim 10, the first voltage regulator further to isolate the first output from the supply voltage when the second control signal is in a fourth state.

12. The power management system of claim 11, wherein, when the second control signal is in the third state, the first control signal is in the first state, and when the second control signal is in the fourth state, the first control signal is in the second state.

13. A method comprising:
    receiving, at a first input of a first voltage regulator, a supply voltage;
    regulating, by the first voltage regulator, the supply voltage to a first regulated voltage;
    providing, at a first output of the first voltage regulator, the first regulated voltage;
    receiving, at a second input of a second voltage regulator, the first regulated voltage;
    receiving, at a first control input of the second voltage regulator, a first control signal in a first state;
    regulating, by the second regulator, the first regulated voltage to a second regulated voltage in response to receiving the first control signal in the first state;
    providing, at a second output of the second voltage regulator, the second regulated voltage in further response to receiving the first control signal in the first state;
    receiving, at the first control input, the first control signal in a second state; and
    providing, at the second output, the first regulated voltage in response to receiving the first control signal in the second state;
    coupling a first terminal of a capacitor the first output;
    coupling a second terminal of the capacitor to a ground plane; and
    receiving, at a second control input of the first voltage regulator, a second control signal in a third state, wherein regulating the supply voltage to the first regulated voltage and providing the first regulated voltage at the first output are in response to receiving the second control signal in the third state.

14. The method of claim 13, further comprising:
receiving, at the second control input, the second control signal in a fourth state; and
isolating the first output from the supply voltage when the second control signal is in the fourth state.

15. The method of claim 14, wherein, when the second control signal is in the third state, the first control signal is in the first state, and when the second control signal is in the fourth state, the first control signal is in the second state.

16. A power management system comprising:
a first voltage regulator having an input coupled to a first voltage supply terminal and an output, the first voltage regulator configured to provide a first regulated voltage as an operating voltage at the output based on a first control signal received at the first voltage regulator, the first voltage regulator in a low power state during a retention mode;
a second voltage regulator having an input connected to the output of the first voltage regulator, the second voltage regulator configured to provide at an output a regulated voltage based on a second control signal, the second voltage regulator bypassed during an operating mode; and
a control circuit coupled to the second voltage regulator, the control circuit configured to provide the second control signal to the second voltage regulator, the second control signal in a first state during the retention mode and a second state during the operating mode.

17. A power management system comprising:
a first voltage regulator having an input coupled to a first voltage supply terminal and an output, the first voltage regulator configured to provide a first regulated voltage as an operating voltage at the output based on a first control signal received at the first voltage regulator;
a second voltage regulator formed as a cap-less low-dropout (LDO) regulator having an input coupled to the output of the first voltage regulator, the second voltage regulator configured to provide at an output a regulated voltage based on a second control signal, the second voltage regulator including a transistor having a first current electrode coupled to the output of the first voltage regulator and a second current electrode coupled to provide the regulated voltage based on the second control signal; and
a control circuit coupled to the second voltage regulator, the control circuit configured to provide the second control signal to the second voltage regulator.

* * * * *